United States Patent
Montes et al.

(10) Patent No.: US 6,864,416 B2
(45) Date of Patent: Mar. 8, 2005

(54) ELECTROSTATIC CHARGE DEIONIZING LIGHTNING CONDUCTOR

(76) Inventors: Angel Rodriguez Montes, Casa Vella 2ª planta, Llorts-Ordino (Principado de Andorra) (ES); Antonio Claveria Canal, El Cedre 22, Santa Coloma (Andorra) (ES)

( * ) Notice: Subject to any disclaimer, the term of this patent is extended or adjusted under 35 U.S.C. 154(b) by 0 days.

(21) Appl. No.: 10/737,614

(22) Filed: Dec. 16, 2003

(65) Prior Publication Data

US 2004/0140121 A1 Jul. 22, 2004

(30) Foreign Application Priority Data

Dec. 16, 2002 (ES) .......................................... 200202884

(51) Int. Cl.⁷ .............................................. H02G 13/00
(52) U.S. Cl. ...................... 174/2; 174/17 GF; 361/220
(58) Field of Search ................. 174/1–3, 4 R, 174/6, 11 R, 17 GF; 361/212, 220, 230

(56) References Cited

U.S. PATENT DOCUMENTS

| | | | | |
|---|---|---|---|---|
| 2,815,395 A | * | 12/1957 | Donelli ........................ | 174/4 R |
| 4,039,739 A | * | 8/1977 | Donelli ........................ | 174/4 C |
| 4,180,698 A | * | 12/1979 | Carpenter, Jr. ................. | 174/2 |
| 4,444,671 A | * | 4/1984 | Wiltgen, Jr. ................... | 252/5 |
| 4,540,844 A | * | 9/1985 | Sautereau et al. .............. | 174/3 |
| 4,565,900 A | * | 1/1986 | Arnau ........................... | 174/3 |
| 4,875,132 A | * | 10/1989 | Olivenbaum .................... | 174/2 |
| 5,116,583 A | * | 5/1992 | Batchelder et al. ............ | 361/230 |
| 5,532,902 A | * | 7/1996 | Beyer et al. ................... | 361/230 |
| 5,932,838 A | * | 8/1999 | Carpenter, Jr. ................ | 174/2 |
| 6,072,684 A | * | 6/2000 | Eybert-Berard et al. ..... | 361/212 |
| 6,307,149 B1 | * | 10/2001 | Zini et al. ...................... | 174/3 |
| 6,646,854 B2 | * | 11/2003 | Fowler et al. ................. | 361/220 |

* cited by examiner

Primary Examiner—Dean A. Reichard
Assistant Examiner—Adolfo Nino
(74) Attorney, Agent, or Firm—Michael J. Striker

(57) ABSTRACT

An electrostatic charge deionizing lighting conductor has two frameworks having different geometries and being electrically separated from one another, insulators which electrically separate the frameworks from one another and must support the frameworks in the insulators and being electrically insulated, each of the insulators being provided with a variable dielectric, so that each of the insulators, when it counter balances an energy within it, annuls a saturation of electrical charges in an atmosphere of a protected area which are responsible of thunderbolt formation, its scope being variable according to a geographic area to be protected and the values being of about 650 meter radius.

5 Claims, 1 Drawing Sheet

ELECTROSTATIC CHARGE DEIONIZING LIGHTNING CONDUCTOR

BACKGROUND OF THE INVENTION

The present invention relates to electrostatic charge deionizing lightning conductors.

More particularly, it relates to an electrostatic charge deionizing lightning conductor which incorporates a system capable of expanding the electric influence of a high voltage atmospheric field.

In the event of electric atmospheric charge an electronic discharge can occur between clouds of rain or between one of said clouds and the earth. The discharge is visible with sinuous path and irregular ramifications, sometimes from several kilometers which is a phenomena known as a lightning. At the same time, a sound wave also occurs called "thunderbolt".

The way in which the clouds are charged with electricity is not known, but most possess a negative charge at the bottom and a positive charge at the top. The different hypotheses explaining how such polarization occurs may be split into two categories: those stating that ice is required and those stating it is not required. Many weathermen think that ice is a necessary factor because thunderbolt is generally not observed until ice has been formed in the higher layers of the clouds.

Some experiments have shown that when water dissolutions are frozen, the ice gains a negative charge while the water remains positively charged. If after starting the solidification, the air which is coming up draw out droplets of water from the frozen particles, such droplets will concentrate at the top of the cloud, and the ice, in bigger aggregates, will go down the bottom.

On the other hand, some experiments have shown that the bigger water drops, falling more quickly, become negative, while the droplets which are falling slower, become electropositive. Thus, the polarization of a cloud may be produced by the different falling speed of the drops either big or small. As the negative charge is formed at the bottom of the cloud it leads to another positive charge on the earth located below, which acts as a second plate of a huge condenser.

When the electric potential between two clouds or between one cloud and the earth reaches a sufficient range (about 10.000 V per cm), the air is ionized along the narrow path, and the flash of a lightning occurs. It is believed that it is the way in which the negative charge is carried to the earth and thus the total negative charge of the surface of the earth is preserved.

It is also thought that the clouds electric polarization may be the cause of the precipitation and not a consequence thereof and that the electric potential existing between the ionsphere—the atmosphere higher layer—and the earth leads to the polarization.

According to this theory, the hot air flow ascending through a cloud carries with it particles having a positive charge which are accumulated at the top of the cloud and which attracts negative charges from the ionosphere. These later are directed to the bottom of the cloud by powerful descending currents of the periphery of the cloud. This way it is prevented that opposite charges neutralize each other. 90% the thunderbolt which go from clouds to the earth are negative; the rest consists in positive flashes. Less often thunderbolt may occur from the earth up the clouds, namely from the top of mountains of from high located objects such as radio antennas.

Surveys with quick motion cameras evidenced that most of the thunderbolt flashes are multiple events composed of up to 42 main "thunderbolts" each being preceded by a guiding thunderbolt.

They all follow an initial ionized path which can be ramified with the current flow. As the duration of the thunderbolt is not over 0,0002 s, the periods of time between each thunderbolt occupies most of the duration of a "flash". The so-called sheet thunderbolt, are but the reflection of an ordinary thunderbolt in the clouds, the so-called ball-shaped thunderbolt is a rare phenomenon in which the discharge is a slow and luminous ball-shaped discharge which some times explode and some times it simply fades out.

In the prior art passive lightning conductors are known which are provided with a starting device such as a "Franklin" for having multipoint systems. The operation of such conductors is based on the ionization and excitation, either constant or pulsed of the electro-atmospheric field for achieving the basic and essential objective, which is to try to collect the discharge from the thunderbolt.

It is worthwhile mentioning also radioactive lightning conductors which for obvious reasons have been abandoned, and are no longer used and their radioactive sources have been recovered in a suitable way and stored in areas for special residues.

Other protection devices against the electro-atmospheric phenomenon must be mentioned which are based on filtering high frequencies and the harmonic components, having available at least two electric connections external to the head which are mainly constituted of elements such as bobbins, resistors and condensers internally connected, all of them characterized in that they contain silica sands absorbing the thermal inertia when the whole of the system is operating.

SUMMARY OF THE INVENTION

Accordingly, it is an object of the present invention to provide an improved electrostatic charge deionizing lightning conductor.

It is another object of the present invention to provide such an electrostatic charge deionizing lightning conductor which is based on counterbalancing the electrical field generated between different points on the earth and the atmosphere with the electrostatic charges having opposite signs.

More particularly, it is an object of the present invention to provide a system that expends such natural energy provided, which gives light to the lightning conductor from a high voltage, from such electric field, generally of about 3000 volts according to the geographical areas.

The lighting conductor of this invention is constituted by two aluminum frameworks, mechanically separate from each other by three insulating deionizing devices within which a dielectric (preferably inert gas) has been arranged, variable according to the excitation of such electrostatic field.

The deionizing lightning conductor having an electrostatic charge constituted according to the above disclosed and which is the object of the invention has an atypical operation and quite different from the operation principles of the current systems of lightning conductors.

The system annuls the saturation of electrostatic charges in the atmosphere which are responsible of the thunderbolt formation.

The lightning conductor is made of materials approved by the European Community, containing no minerals, silica or special earths, radioactive components releasing contaminant radiations, explosives nor any other product which could affect the safety of persons or be harmful for the environment.

Installing earth connections and electric conductors to the earth as well as their physical situation, will be performed pursuant to the rules in force on lighting conductors, and they require no additional power supply nor external connection.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
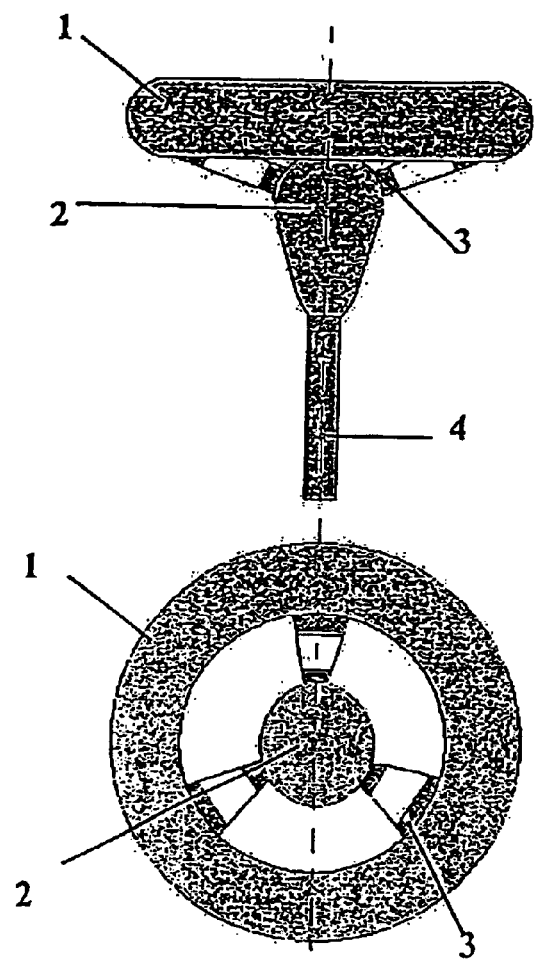
FIG. 1 is a view showing a side elevation and a plan view of the lightning conductor in accordance with the present invention.
Figure 2:
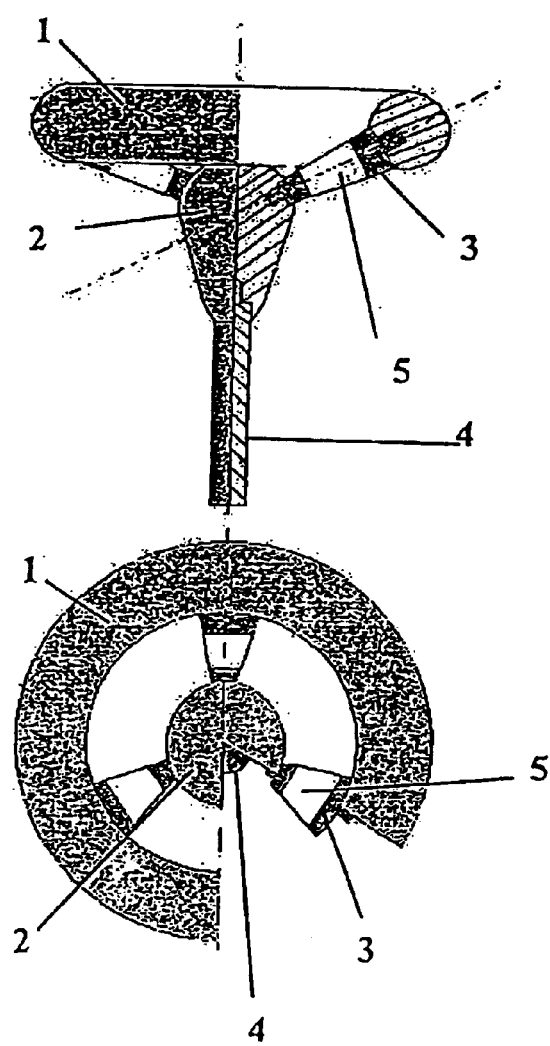
FIG. 2 is a view showing a longitudinal section and a plan view of the lightning conductor in accordance with the present invention.

As shown in FIG. 1, a deionizing lightning conductor with electrostatic charge in accordance with the present invention has two frameworks. The frameworks include a ring-shaped framework 1 and an inverted pear-shaped framework 2. They are electrically separated by an insulator 3 which is formed as a cone-shaped support and composed of an insulating material. All elements are further supported by a mast 4 which is duly electrically protected.

A dielectric 5 is arranged at an internal part of the insulator 3, such as an inert gas. It is variable according to the excitation of the atmospheric electrostatic field between the framework 1 and the framework 2. The device is formed so that at the moment in which the electrostatic field reaches a value of about 3000 volts according to the geographic area, the deionizing system is activated, expending the natural electric influence provided to that field, from a constant consumption, the electrostatic field deionizing conductor will light.

Each insulator, when it counterbalances the energy within it, annuls the saturation of the electrostatic charges in the atmosphere of the protective area which are responsible for thunderbolt formation, its scope being variable according to the geographic area to be protected and the set value being of about a 650 meter radius.

The external shape, arrangement and external appearance of the elements forming the light conductor, as well and external appearance of the elements sustain technical variations according to the requirements of protection of a given geographical or surface, with its environment context, the basic aim of this invention. The mentioned factors will not limit the spirit of this patent of invention.

It will be understood that each of the elements described above, or two or more together, may also find a useful application in other types of constructions differing from the types described above.

While the invention has been illustrated and described as embodied in electrostatic charge deionizing lightning conductor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. An electrostatic charge deionizing lightning conductor, comprising two frameworks having different geometries and being electrically separated from one another; insulators which electrically separate said frameworks from one another and a must supporting said frameworks and said insulators and being electrically insulated; each of said insulators being provided with a variable dielectric according to an atmospheric electrostatic field, so that each of said insulators, when each of said insulators balances an energy within it, annuls a saturation of electrical charges in an atmosphere for a protected area which are responsible of thunderbolt formation with a scope being variable according to a geographic area to be protected and said values being of about a 650 meter radius.

2. An electrostatic charge deionizing lightning conductor as defined in claim 1, wherein said frameworks are composed of aluminum.

3. An electrostatic charge deionizing lightning conductor as defined in claim 1, wherein said insulators include three said insulators.

4. An electrostatic charge deionizing lightning conductor as defined in claim 1, wherein said variable dielectric is an inert gas.

5. An electrostatic charge deionizing lightning conductor as defined in claim 1, wherein one of said frameworks is ring-shaped, while another of said frameworks is inverted pear-shaped.

\* \* \* \* \*